US009379510B2

(12) United States Patent
Ito et al.

(10) Patent No.: US 9,379,510 B2
(45) Date of Patent: Jun. 28, 2016

(54) METHOD FOR MANUFACTURING CIRCUIT BODY AND WIRE HARNESS

(75) Inventors: Kota Ito, Makinohara (JP); Yoshiaki Suzuki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 81 days.

(21) Appl. No.: 13/604,953

(22) Filed: Sep. 6, 2012

(65) Prior Publication Data

US 2012/0325553 A1 Dec. 27, 2012

Related U.S. Application Data

(63) Continuation of application No. PCT/JP2011/056676, filed on Mar. 15, 2011.

(30) Foreign Application Priority Data

Mar. 15, 2010 (JP) ................................ 2010-057911
Apr. 26, 2010 (JP) ................................ 2010-101147

(51) Int. Cl.
*H01B 13/06* (2006.01)
*H02G 15/04* (2006.01)
*H01R 43/24* (2006.01)

(52) U.S. Cl.
CPC .................................... *H01R 43/24* (2013.01)

(58) Field of Classification Search
CPC .... H01R 43/20; H01R 43/24; H01R 2105/00; H01R 2107/00; H01R 2201/26
USPC .............................. 174/70 R, 74 R; 439/736
See application file for complete search history.

(56) References Cited

U.S. PATENT DOCUMENTS 5,267,338 A 11/1993 Bullock et al.
5,365,659 A 11/1994 Ueda et al.
6,190,212 B1 * 2/2001 Brown .................. H01R 43/24 439/106
6,658,312 B1 12/2003 Hagiyama
2001/0035297 A1 * 11/2001 Tamai ...................... 174/133 R (Continued)

FOREIGN PATENT DOCUMENTS

CN 1513220 A 7/2004
CN 1518166 A 8/2004

(Continued)

OTHER PUBLICATIONS

Office Action dated Feb. 12, 2014, issued by the Japanese Patent Office in counterpart Japanese Application No. 2010-101147.

(Continued)

*Primary Examiner* — Hoa C Nguyen
*Assistant Examiner* — Amol Patel
(74) *Attorney, Agent, or Firm* — Sughrue Mion, PLLC

(57) ABSTRACT

The wire harness as the circuit body is obtained as described below. In step S1, a long core wire constructed of a conductive metal is cut in a predetermined length. In step S2, a terminal part is molded in an end portion of the core wire and the core wire is bent in a predetermined shape. In step S3, a covering part is integrally molded in the center of the core wire. In step S4, a rubber stopper is integrally molded in an end portion of the covering part. In step S5, a conductor thin film sheet and a shield shell are assembled. In step S6, a connector housing is integrally molded. In step S7, packing is integrally molded. In step S8, a protective part is integrally molded.

4 Claims, 7 Drawing Sheets

(56) References Cited

U.S. PATENT DOCUMENTS

| | | | |
|---|---|---|---|
| 2004/0139606 A1 | 7/2004 | Inada et al. | |
| 2004/0242068 A1 | 12/2004 | Fukuda et al. | |
| 2005/0136751 A1 | 6/2005 | Inada et al. | |
| 2006/0049545 A1 | 3/2006 | Gallant et al. | |
| 2009/0130901 A1 | 5/2009 | Aoki et al. | |

FOREIGN PATENT DOCUMENTS

| | | | | |
|---|---|---|---|---|
| CN | 1551427 | A | | 12/2004 |
| CN | 1235233 | C | | 1/2006 |
| CN | 101436736 | A | | 5/2009 |
| DE | 10 2008 003 332 | A1 | | 7/2009 |
| DE | 102008003332 | A1 | | 7/2009 |
| EP | 1282205 | A1 | | 2/2003 |
| FR | 2539253 | A1 | | 7/1984 |
| FR | 2 691 007 | A1 | | 11/1993 |
| JP | 6005132 | A | | 1/1994 |
| JP | 6103842 | A | | 4/1994 |
| JP | 08-315641 | A | | 11/1996 |
| JP | 08315641 | A | * | 11/1996 |
| JP | 11339572 | A | | 12/1999 |
| JP | 2000-322944 | A | | 11/2000 |
| JP | 2001307559 | A | | 11/2001 |
| JP | 2002245875 | A | | 8/2002 |
| JP | 2003031052 | A | | 1/2003 |
| JP | 2003031055 | A | * | 1/2003 |
| JP | 2003-323819 | A | | 11/2003 |
| JP | 2005-294132 | A | | 10/2005 |
| JP | 2005294132 | A | * | 10/2005 |
| JP | 2005-332607 | A | | 12/2005 |
| WO | 9928161 | A1 | | 6/1999 |
| WO | 0235672 | A2 | | 5/2002 |
| WO | 2009/086992 | A1 | | 7/2009 |

OTHER PUBLICATIONS

International Search Report (PCT/ISA/210) dated Jun. 29, 2011 issued by the International Searching Authority in corresponding International Application No. PCT/JP2011/056676.

Written Opinion (PCT/ISA/237) dated Jun. 29, 2011 issued by the International Searching Authority in corresponding International Application No. PCT/JP2011/056676.

Office Action, dated Jul. 22, 2014, issued by Commissioner of JPO in counterpart Patent Application No. 2010-101147.

Office Action, dated May 5, 2014, issued by the State Intellectual Property Office of the People's Republic of China in counterpart Chinese Application No. 201180014024.7.

* cited by examiner

METHOD FOR MANUFACTURING CIRCUIT BODY AND WIRE HARNESS

CROSS REFERENCE TO RELATED APPLICATION

This application is a continuation of PCT application No. PCT/JP2011/056676, which was filed on Mar. 15, 2011 based on Japanese Patent Application (No. 2010-057911) filed on Mar. 15, 2010 and Japanese Patent Application (No. 2010-101147) filed on Apr. 26, 2010, the contents of which are incorporated herein by reference. Also, all the references cited herein are incorporated as a whole.

BACKGROUND OF THE INVENTION

1. Field of the Invention

The present invention relates to a method for manufacturing a circuit body installed to an automobile as a mobile unit, and a wire harness.

2. Description of the Related Art

An automobile etc. as a mobile unit is equipped with various electronic devices. Therefore, in the automobile etc., a wire harness as a circuit body is installed in order to transmit, for example, a control signal from a computer etc. or an electric power from a power source etc. to the electronic devices. The wire harness includes a plurality of electric wires, a connector attached to an end portion etc. of the electric wires, and an exterior product such as a protector for covering a predetermined portion of the electric wires, etc.

The electric wire includes a conductive core wire, and a covering part made of an insulating synthetic resin for covering the core wire. The electric wire is the so-called covered electric wire. The electric wire is manufactured by extruding the insulating synthetic resin around the outer peripheral surface of the core wire so as to cover the outer peripheral surface with the insulating synthetic resin.

The connector includes a conductive metal terminal, and an insulating connector housing. The metal terminal is attached to the end portion etc. of the electric wire and is electrically connected to the core wire of the electric wire. The connector housing is formed in a box shape and includes a plurality of terminal receiving chambers for receiving the metal terminals.

The protector is constructed of an insulating synthetic resin and is formed in a tube shape for receiving the predetermined portion of the electric wire inside the protector. Also, a locking protrusion is disposed integrally with the protector in order to fix the wire harness to a body of the automobile, and is retained by the body.

In the time of assembling the wire harness, after the electric wire is first cut in a predetermined length, the metal terminal is attached to the end portion etc. of the electric wire. As necessary, the electric wires are mutually connected to each other. Thereafter, the metal terminal is inserted into the terminal receiving chamber of the connector housing. Also, the exterior product such as the protector is attached to the predetermined portion of the electric wire and the wire harness described above is assembled. A connector is coupled to the connector of the electronic device described above and the wire harness is installed to the automobile etc. The wire harness supplies a predetermined signal, or electric power, etc. to the electronic device.

The protector or the connector housing of the wire harness that is described above has various product numbers depending on kinds and the number of metal terminals received, thicknesses and the number of electric wires received, or a situation of installing to the automobile, etc. Further, the wire harness has various components such as a tube for harness, a grommet for harness, a clip for wiring and a waterproof stopper in addition to the protector that is described above as the exterior product, and each of the components has various product numbers.

Therefore, in factories etc. for assembling the wire harness, it was necessary to previously stock all the exterior products with the various product numbers, and space for once stocking the exterior products with these various product numbers increased and also very much time and effort to perform inventory control of the exterior products with the various product numbers were required. Further, time and effort to transport the various exterior products from the factory for manufacturing the exterior product to the factory for manufacturing the wire harness were required. For these reasons, a cost of the wire harness tended to increase.

SUMMARY OF THE INVENTION

Therefore, an object of the present invention is to provide a method for manufacturing a circuit body and a wire harness capable of curtailing a transportation cost necessary for an exterior product, a cost for inventory control and space necessary for a factory and reducing the cost of the wire harness.

In order to solve the problems and achieve the object, a first aspect of the present invention provides with a method for manufacturing a circuit body comprising at least one long conductor member constructed of a conductive metal, and a plurality of exterior products constructed of an insulating synthetic resin and attached to a predetermined portion of the conductor member, the method comprising: a first member molding step of integrally molding a first exterior product of the plurality of exterior products in the predetermined portion of the conductor member and attaching said first exterior product to the conductor member, and a second member molding step of integrally molding a second exterior product of the plurality of exterior products in the predetermined portion of the conductor member and attaching said second exterior product to the conductor member.

A second aspect of the present invention provides with a method for manufacturing the circuit body as defined in the first aspect of the present invention, further comprising a terminal molding step of molding an end portion of the conductor member in a terminal shape.

A third aspect of the present invention provides with a method for manufacturing the circuit body as defined in the second aspect of the present invention, further comprising a housing molding step of integrally molding a connector housing for covering an end portion of the conductor member formed in the terminal shape as the exterior product in the end portion as a predetermined portion of the conductor member and attaching the connector housing to the conductor member.

A fourth aspect of the present invention provides with a wire harness comprising at least one long conductor member constructed of a conductive metal; a plurality of exterior products constructed of an insulating synthetic resin and attached to a predetermined portion of the conductor member; a first exterior product of the plurality of exterior products integrally molded with and attached to the predetermined portion of the conductor member; and a second exterior product of the plurality of exterior products integrally molded with and attached to the predetermined portion of the conductor member.

A fifth aspect of the present invention provides with a wire harness as defined in the fourth aspect of the present invention, further comprising a terminal part obtained by molding an end portion of the conductor member in a terminal shape.

A sixth aspect of the present invention provides with a wire harness as defined in the fifth aspect of the present invention, further comprising a connector housing which covers the terminal part as the exterior products and is integrally attached to the end portion as the predetermined portion of the conductor member.

In addition, the exterior products in the present invention mean wire harness components such as the connector housing, a covering part, a waterproof stopper, a tape for harness, a tube for harness, a protector for harness, a grommet for harness, a clip for wiring, and packing. That is, the exterior products in the present specification mean all the components obtained by molding from the insulating synthetic resin among the harness components.

Also, the integral molding in the present invention means that, for example, a portion of the conductor member is positioned inside a metal mold and insert molding or outsert molding of the exterior product constructed of the synthetic resin is performed and the portion of the conductor member is covered or the exterior product is attached and fixed to the conductor member and the exterior product is integrated with the conductor member.

As described above, in the first aspect of the present invention, there is no need to previously stock the first exterior product and the second exterior product obtained by being integrally molded in the predetermined portion of the conductor member, so that the need for time and effort necessary for inventory control or space for stocking the exterior products is eliminated and also the need for a transportation cost of the exterior products is eliminated. Therefore, a cost of the wire harness can be reduced.

In the second aspect of the present invention, there is no need to previously stock the terminal part obtained by molding the end portion of the conductor member in the terminal shape, so that the need for time and effort necessary for inventory control or space for stocking the terminal part is eliminated and also the need for a transportation cost of the terminal part is eliminated. Therefore, the cost of the wire harness can be reduced.

In the third aspect of the present invention, there is no need to previously stock the connector housing obtained by being integrally molded in the end portion of the conductor member, so that the need for time and effort necessary for inventory control or space for stocking the connector housing is eliminated and also the need for a transportation cost of the connector housing is eliminated. Therefore, the cost of the wire harness can be reduced.

In the fourth aspect of the present invention, there is no need for the manufacturing factory of the wire harness to previously stock the first exterior product and the second exterior product obtained by being integrally molded in the predetermined portion of the conductor member, so that the need for time and effort necessary for inventory control or space for stocking the exterior products is eliminated and also the need for the transportation cost of the exterior products is eliminated. Therefore, the cost of the wire harness can be reduced.

In the fifth aspect of the present invention, there is no need to previously stock the terminal part obtained by molding the end portion of the conductor member in the terminal shape, so that the need for time and effort necessary for inventory control or space for stocking the terminal part is eliminated and also the need for the transportation cost of the terminal is eliminated. Therefore, the cost of the wire harness can be reduced.

In the sixth aspect of the present invention, there is no need to previously stock the connector housing obtained by being integrally molded in the end portion of the conductor member, so that the need for time and effort necessary for inventory control or space for stocking the connector housing is eliminated and also the need for the transportation cost of the connector housing is eliminated. Therefore, the cost of the wire harness can be reduced.

DESCRIPTION OF THE PREFERRED EMBODIMENTS

Figure 1:
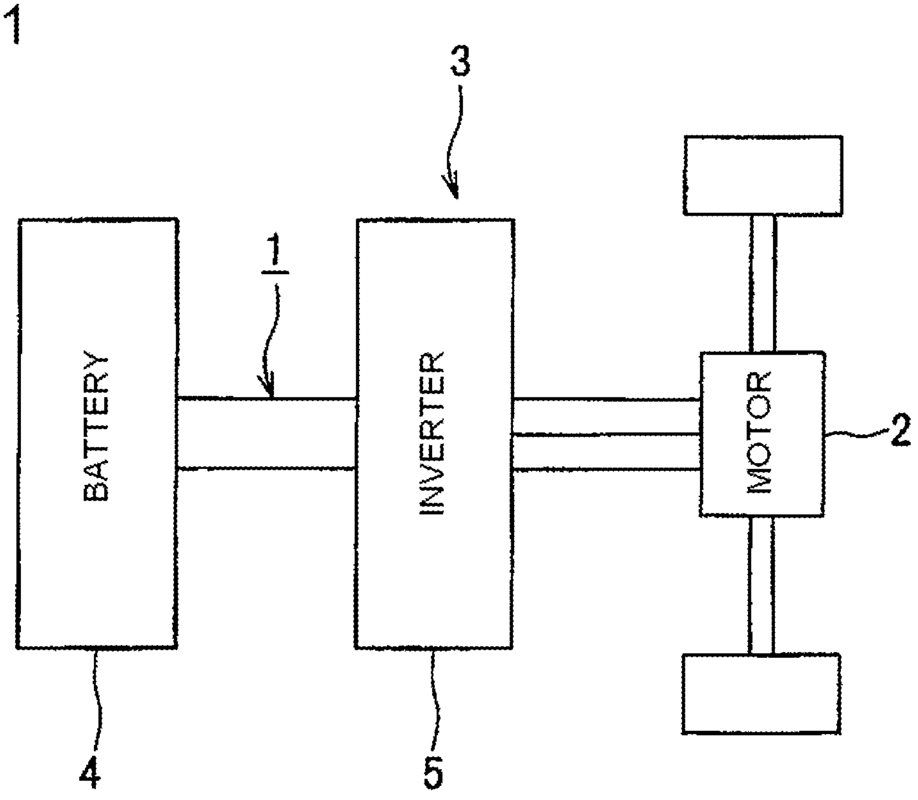
FIG. 1 is an explanatory diagram schematically showing a configuration of an automobile to which a wire harness according to one embodiment of the present invention is installed.
Figure 2:
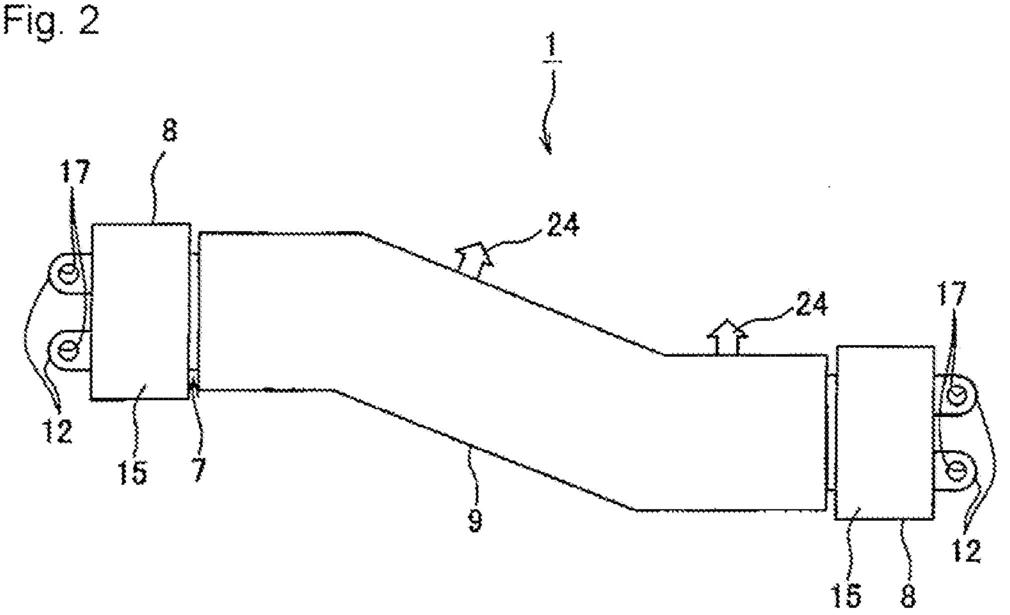
FIG. 2 is an explanatory diagram schematically showing a configuration of the wire harness shown in FIG. 1.
Figure 3:
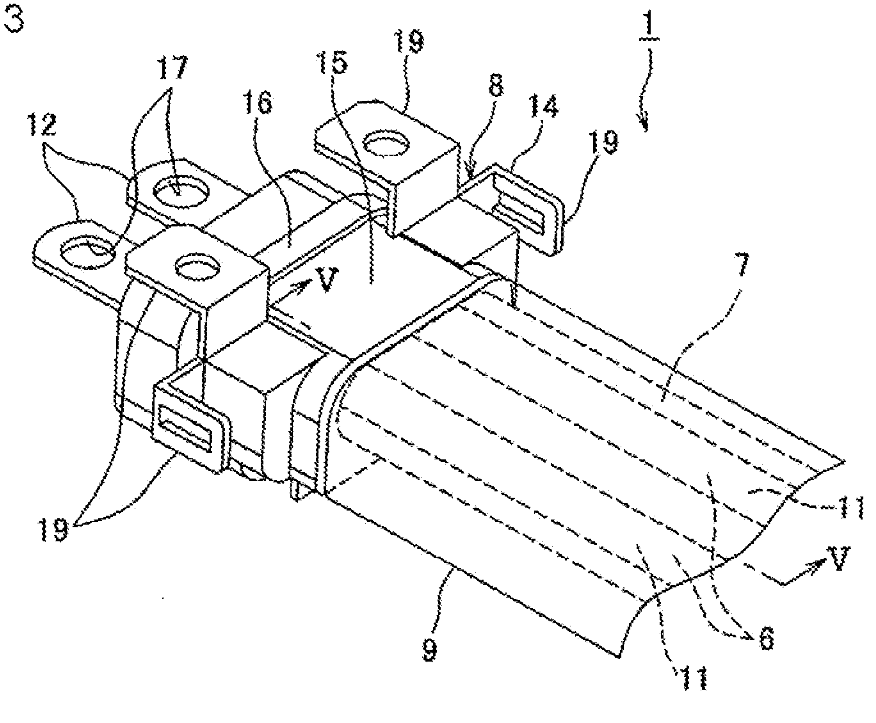
FIG. 3 is a perspective view of a shield connector etc. disposed in an end portion of the wire harness shown in FIG. 2.
Figure 4:
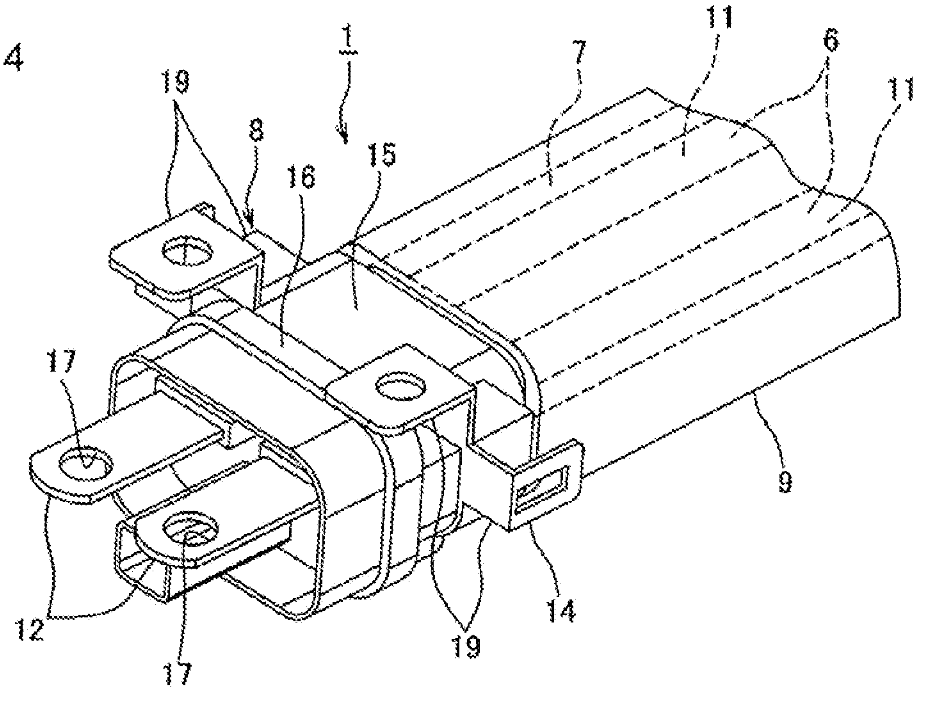
FIG. 4 is another perspective view of the shield connector etc. disposed in the end portion of the wire harness shown in FIG. 2.

A method for manufacturing a circuit body and a wire harness of one embodiment of the present invention will hereinafter be described with reference to FIGS. 1 to 7. A wire harness 1 as the circuit body according to the present embodiment is used in an automobile 3 capable of traveling by a driving force of a motor 2 of a hybrid vehicle, an electric vehicle, etc. shown in FIG. 1 etc. The wire harness 1 is used for connecting a battery 4 of the automobile 3 to an inverter 5 etc.

The wire harness 1 includes a plurality of (two in the illustrated example) electric wires 6, a conductor thin film sheet 7 as a shield member (shown in FIGS. 3 and 4), shield connectors 8 as connectors attached to both end portions of these electric wires 6, and a protective part 9 for covering the whole center excluding the end portions of these electric wires 6.

Figure 5:
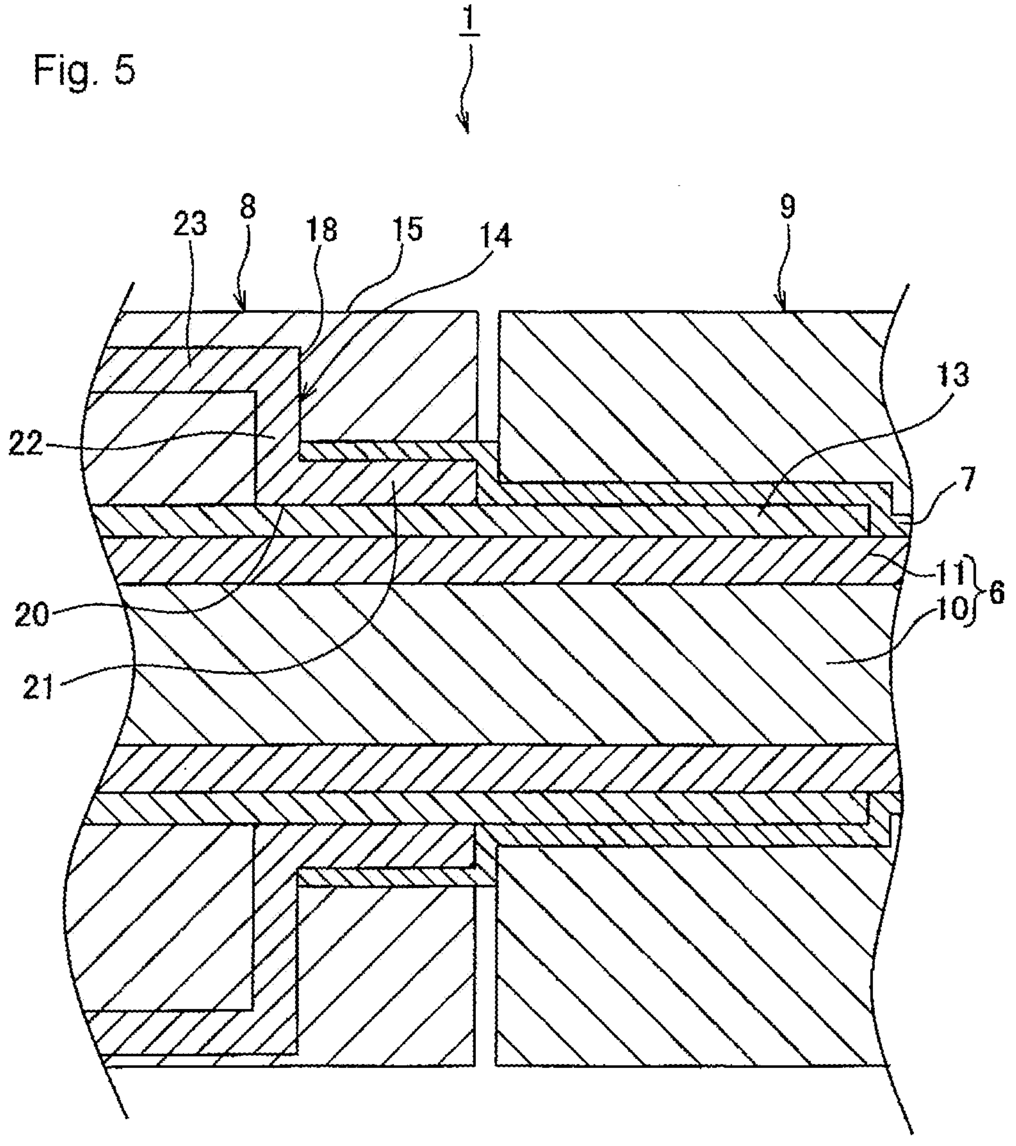
FIG. 5 is a sectional view taken along line V-V in FIG. 3.

The electric wire 6 includes a core wire 10 as a conductive conductor member and a covering part 11 as an insulating exterior product as shown in FIG. 5. The core wire 10 is constructed of a conductive metal and is constructed of one metal bar formed in a long size. A length of the core wire 10 is formed in a length defined for connecting the battery 4 of the automobile 3 to the inverter 5 and also, the core wire 10 is bent and formed in a predetermined shape so that the battery 4 can be connected to the inverter 5 in the case of being installed to the automobile. Also, the core wire 10 may be formed by twisting a plurality of strands or may be constructed of a long strip-shaped member (also called a bus bar) constructed of a metal.

The covering part 11 is constructed of an insulating synthetic resin, and covers the center (substantially the whole) excluding the end portions of the core wire 10. The covering part 11 is obtained by integrally molding the insulating synthetic resin around the core wire 10.

The conductor thin film sheet 7 is constructed of at least one of aluminum, iron, copper, silver, other alloys, etc. and is formed in a sheet shape and also, covers the electric wires 6 by being wound around the center (substantially the whole) excluding end portions of the two electric wires 6.

The shield connector 8 includes terminal parts 12, a rubber stopper (also called a waterproof stopper) 13 as an exterior product, a shield shell 14 as a shield member, a connector housing 15 as the exterior product and packing 16 as the exterior product as shown in FIG. 5. The terminal part 12 is obtained by being molded in the so-called terminal shape in which the end portion of the core wire 10 is formed in a strip plate shape and a through-hole 17 (shown in FIGS. 3 and 4) is disposed. The terminal part 12 is obtained by performing plastic processing such as forging processing in the end portion of the core wire 10. That is, the terminal part 12 is molded integrally with the core wire 10.

The rubber stopper 13 is constructed of a synthetic resin having insulation and elasticity, and covers the whole periphery of the end portion of the covering part 11. The rubber stopper 13 prevents liquid such as water from entering the connector housing 15 through a gap in the electric wire 6. The rubber stopper 13 is obtained by integrally molding the synthetic resin having insulation and elasticity around the end portion of the covering part 11.

The shield shell 14 is obtained by, for example, folding a conductive thick sheet metal, and includes a bottomed tubular part 18, a plurality of flanges 19, a through-hole 20 and a through tube 21. The bottomed tubular part 18 integrally includes a flat bottom wall 22 and a tube wall 23 erected from the whole periphery of the outer edge of this bottom wall 22. The flange 19 is erected toward an outer peripheral direction of the tube wall 23 from the tube wall 23, that is, toward the outer peripheral direction of the shield shell 14. The flange 19 is used for fixing the shield connector 8 to the battery 4 or the inverter 5. Also, the flange 19 protrudes from an outer surface of the connector housing 15. The through-hole 20 is disposed in the center of the bottom wall 22 of the bottomed tubular part 18 and extends through the center of the bottom wall 22. The two electric wires 6 described above are inwardly passed through the through-hole 20. The through tube 21 is erected in a direction opposite to the tube wall 23 from the whole periphery of the edge of the through-hole 20. The two electric wires 6 described above are inwardly passed through the through tube 21.

In the shield shell 14 constructed as described above, the through tube 21 is stacked on the rubber stopper 13 and the end portions of the two electric wires 6 are inwardly passed through the shield shell 14 and also, an end portion of the conductor thin film sheet 7 is stacked on the outside of the through tube 21 and the shield shell 14 is attached to the end portions of the two electric wires 6 and the terminal parts 12 are positioned with the top protruding to the inside of the shield shell 14.

The connector housing 15 is constructed of an insulating synthetic resin, and covers the whole periphery of proximal end portions of the terminal parts 12, the rubber stopper 13, the end portion of the covering part 11 and the inside and outside of the shield shell 14. The connector housing 15 is fitted into a connector part disposed in the battery 4 or the inverter 5. The connector housing 15 is obtained by integrally molding the insulating synthetic resin in the whole periphery of the proximal end portions of the terminal parts 12, the rubber stopper 13, the end portion of the covering part 11 and the inside and outside of the shield shell 14. In addition, the connector housing 15 covers the proximal end portions of the terminal parts 12 with the top exposed.

The packing 16 is constructed of a synthetic resin having insulation and elasticity, and is disposed over the whole periphery of an outer peripheral surface of the connector housing 15. The packing 16 is disposed to the top side of the terminal parts 12 from the flanges 19 described above. The packing 16 maintains a gap in the connector part disposed in the battery 4 or the inverter 5 in a watertight state, and prevents liquid such as water from entering through the gap in the connector part. The packing 16 is obtained by integrally molding the synthetic resin having insulation and elasticity over the whole periphery of the outer peripheral surface of the connector housing 15.

The shield connector 8 described above is obtained by performing plastic processing in the end portion of the core wire 10 and being molded in the terminal parts 12 and then integrally molding the rubber stopper 13 to the whole periphery of the end portion of the covering part 11 and attaching the shield shell 14 in a predetermined position of the two electric wires 6 and integrally molding the connector housing 15 and the packing 16 sequentially. The shield connector 8 constructed thus is fitted into the connector part of the battery 4 or the inverter 5 and the terminal parts 12 are connected to terminals of the battery 4 or the inverter 5 and are electrically connected to the battery 4 or the inverter 5.

The protective part 9 is constructed of a synthetic resin having insulation, and covers the periphery of the conductor thin film sheet 7 of the center (substantially the whole) excluding the end portions of the two electric wires 6. The protective part 9 prevents other devices mounted in the automobile from suffering damage from contact with the conductor thin film sheet 7 or the core wire 10. The protective part 9 is obtained by integrally molding the synthetic resin having insulation over the whole periphery of the conductor thin film sheet 7 of the center (substantially the whole) excluding the end portions of the two electric wires 6. Also, a clip 24 for being locked to a body of a chassis etc. of the automobile 3 and fixing the wire harness 1 to the body is disposed integrally with the protective part 9.

The covering part 11, the rubber stopper 13, the connector housing 15, the packing 16 and the protective part 9 in response to the exterior products described above correspond to a first exterior product and a second exterior product described in the solution to problem naturally.

Figure 6:
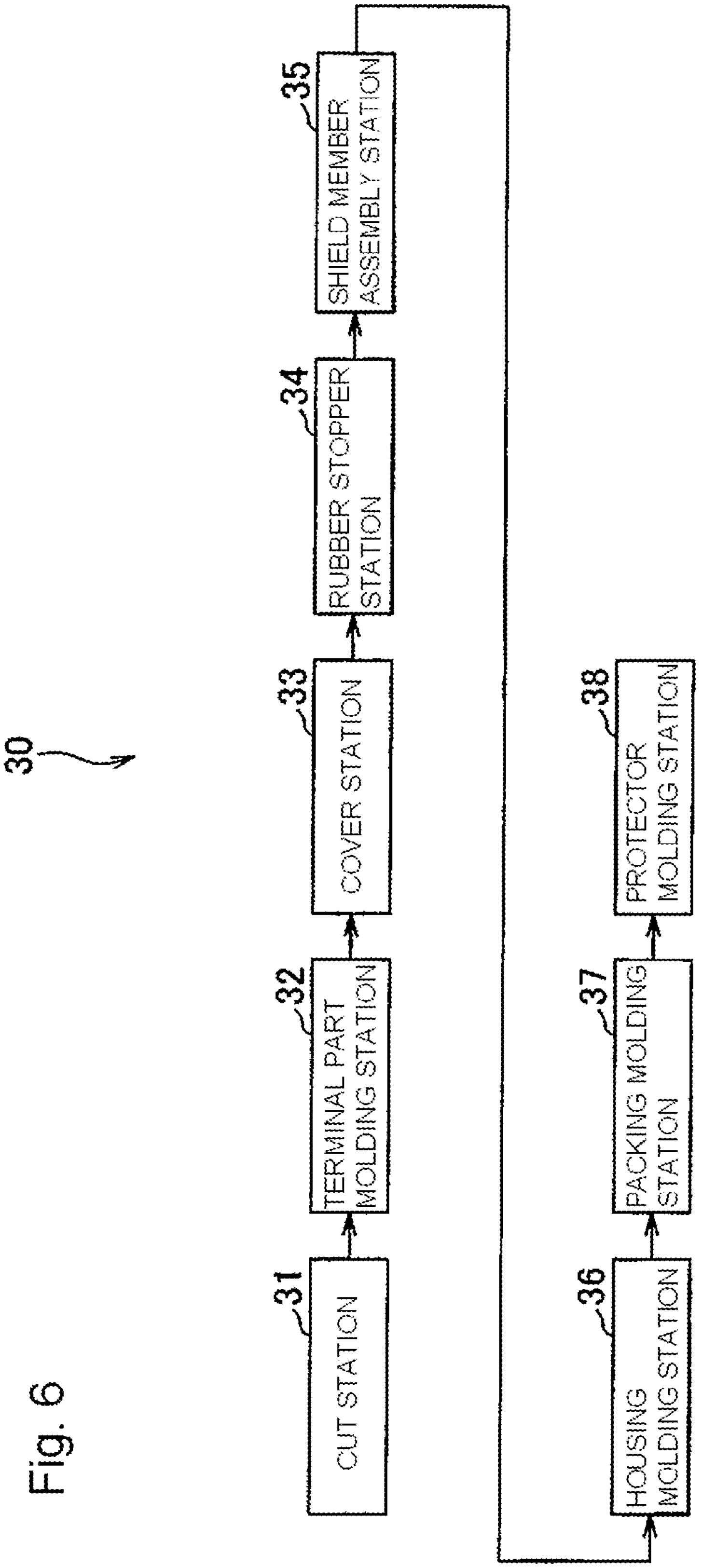
FIG. 6 is an explanatory diagram showing a configuration of a wire harness manufacturing line for manufacturing the wire harness shown in FIG. 1.
Figure 7:
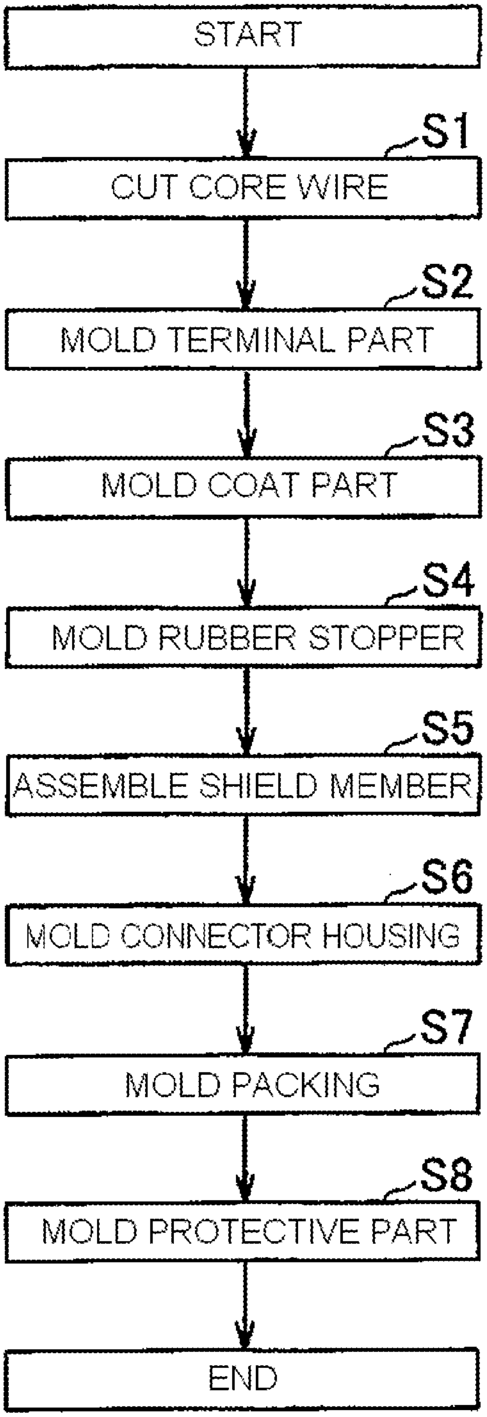
FIG. 7 is a flowchart showing a step of manufacturing the wire harness shown in FIG. 1.

The wire harness 1 described above is manufactured by a wire harness manufacturing line 30 shown in FIG. 6.

The wire harness manufacturing line 30 includes a cut station 31, a terminal part molding station 32, a cover station 33, a rubber stopper station 34, a shield member assembly station 35, a housing molding station 36, a packing molding station 37 and a protector molding station 38 as shown in FIG. 6.

A long core wire 10 wound on, for example, a reel is supplied to the cut station 31. The cut station 31 cuts the long core wire 10 in a predetermined length, and conveys the core wire 10 with the predetermined length obtained by the cut toward the terminal part molding station 32.

The terminal part molding station 32 performs plastic processing such as forging processing in the end portion of the core wire 10, and molds the terminal part in the end portion, and also bends the core wire 10 in a predetermined shape. The terminal part molding station 32 conveys the core wire 10, in which the terminal parts 12 are molded in both end portions, toward the cover station 33.

The cover station 33 integrally molds an insulating synthetic resin around the center (substantially the whole) excluding the end portions of the core wire 10 in which the terminal parts 12 are molded in both end portions, and integrally molds the covering part 11 described above in the center. The cover station 33 conveys the core wire 10, in which the terminal parts 12 are molded in both end portions and the covering part is formed in the center, toward the rubber stopper station 34.

The rubber stopper station 34 integrally molds a synthetic resin having insulation and elasticity around the end portion of the covering part 11 for covering the center of the core wire 10 in which the terminal parts 12 are molded in both end portions, and integrally molds the rubber stopper 13 described above in the end portion of the covering part 11. The rubber stopper station 34 conveys the core wire 10, in which the terminal parts 12 are molded in both end portions and the covering part 11 is formed in the center and also the rubber stopper 13 is formed in the end portion of the covering part 11, toward the shield member assembly station 35.

The shield member assembly station 35 passes the end portions of the two core wires 10, in which the terminal parts 12 are molded in both end portions and the covering part 11 is formed in the center and also the rubber stopper 13 is formed in the end of the covering part 11, through the inside of the shield shell 14, and winds the conductor thin film sheet 7 around the center (substantially the whole) excluding the end portions of the two electric wires 6, and stacks the end portion of the conductor thin film sheet 7 on an outer peripheral surface of the through tube 21. Thus, the shield member assembly station 35 assembles the conductor thin film sheet 7 and the shield shell 14 as the shield member in the two core wires 10, that is, electric wires 6, and conveys the two core wires 10, that is, electric wires 6, in which the conductor thin film sheet 7 and the shield shell 14 are assembled, toward the housing molding station 36.

The housing molding station 36 integrally molds an insulating synthetic resin in the inside and outside, etc. of the shield shell 14, and molds the connector housing 15 described above. Then, the housing molding station 36 conveys the two electric wires 6, in which the connector housings 15 are integrally molded in the end portions, toward the packing molding station 37.

The packing molding station 37 integrally molds a synthetic resin having insulation and elasticity around an outer peripheral surface of the connector housing 15, and molds the packing 16 described above. Then, the packing molding station 37 conveys the two electric wires 6, in which the connector housings 15 and the packings 16 are integrally molded in the end portions, toward the protector molding station 38.

The protector molding station 38 integrally molds a synthetic resin having insulation around the conductor thin film sheet 7, that is, around the center (substantially the whole) excluding the end portions of the electric wires 6, and molds the protective part 9 described above.

In the wire harness manufacturing line 30 constructed as described above, in step S1 shown in FIG. 7, the cut station 31 cuts the long core wire 10 in the predetermined length, and conveys the core wire 10 obtained by being cut in the predetermined length toward the terminal part molding station 32, and a flowchart proceeds to step S2.

In step S2, the terminal part molding station 32 performs the plastic processing such as forging processing in the end portion of the core wire 10, and molds the end portion in a terminal shape and obtains the terminal part 12, and also bends the core wire 10 in the predetermined shape, and conveys the core wire 10 toward the cover station 33, and the flowchart proceeds to step S3. In addition, step S2 forms a terminal molding step described in the solution to problem.

In step S3, the cover station 33 integrally molds the insulating synthetic resin around the center (substantially the whole) excluding the end portions of the core wire 10, and conveys the core wire 10 toward the rubber stopper station 34, and the flowchart proceeds to step S4.

In step S4, the rubber stopper station 34 integrally molds the rubber stopper 13 in the end portion of the electric wire 6, and conveys the core wire 10 toward the shield member assembly station 35, and the flowchart proceeds to step S5.

In step S5, the shield member assembly station 35 assembles the conductor thin film sheet 7 and the shield shell 14 in the two core wires 10, and conveys the two core wires 10 toward the housing molding station 36, and the flowchart proceeds to step S6.

In step S6, the housing molding station 36 integrally molds the insulating synthetic resin in the inside and outside, etc. of the shield shell 14, and molds the connector housing 15 described above, and conveys the two electric wires 6 toward the packing molding station 37, and the flowchart proceeds to step S7. In addition, step S6 forms a housing molding step described in the solution to problem.

In step S7, the packing molding station 37 integrally molds the synthetic resin having insulation and elasticity around the outer peripheral surface of the connector housing 15, and molds the packing 16 described above, and conveys the two electric wires 6 toward the protector molding station 38, and the flowchart proceeds to step S8.

In step S8, the protector molding station 38 integrally molds the synthetic resin having insulation around the conductor thin film sheet 7, that is, around the center (substantially the whole) excluding the end portions of the electric wires 6, and molds the protective part 9 described above. In this manner, the wire harness manufacturing line integrally molds the covering part 11, the rubber stopper 13, the connector housing 15, the packing 16 and the protective part 9 as the exterior products in the core wire 10 sequentially, and assembles the wire harness 1 described above. In addition, step S3, step S4, step S6, step S7 and step S8 described above form a first member molding step and a second member molding step described in the solution to problem.

According to the present embodiment, the covering part 11, the rubber stopper 13, the connector housing 15, the packing 16 and the protective part 9 as the exterior products are integrally molded in a predetermined portion of the core wire 10, so that there is no need to previously stock these exterior products. Therefore, the need for time and effort necessary for inventory control or space for stocking these exterior products is eliminated and also the need for a transportation cost of the exterior products is eliminated. Therefore, a cost of the wire harness 1 can be reduced.

Also, the terminal part 12 is molded in the end portion of the core wire 10, so that there is no need to previously stock the terminal part 12 attached to the end portion of the core wire 10. Therefore, the need for time and effort necessary for inventory control or space for stocking the terminal part 12 is eliminated and also the need for a transportation cost of the terminal part 12 is eliminated. Therefore, the cost of the wire harness 1 can be reduced.

Further, the connector housing 15 as the exterior product is integrally molded in the end portion of the core wire 10, so that there is no need to previously stock the connector housing 15. Therefore, the need for time and effort necessary for inventory control or space for stocking the connector housing 15 is eliminated and also the need for a transportation cost of the connector housing 15 is eliminated. Therefore, the cost of the wire harness 1 can be reduced.

In the embodiment described above, the terminal part 12 is molded in the end portion of the core wire 10, but in the present invention, the terminal part 12 may be formed separately from the core wire 10. Also, in the present invention, harness components such as a tape for harness, a tube for harness, a protector for harness, a grommet for harness and a clip for wiring may be integrally molded in the predetermined portion of the core wire 10. In brief, in the present invention, the plurality of exterior products described above could be integrally molded in the predetermined portion of the conductor member such as the core wire 10 sequentially.

Also, in the embodiment described above, the wire harness 1 for connecting the battery 4 to the inverter 5 is shown. However, the present invention may be applied to the wire harness 1 used for other applications, for example, for transmitting a signal. Also, in the present invention, all the exterior products are not necessarily integrally molded, and it may be retrofitted with a portion of the exterior products.

Further, in the embodiment described above, the wire harness 1 installed to the automobile is described. However, in the present invention, the wire harness 1 etc. may naturally be used in various electric machines or various electronic devices such as a portable computer without being limited to the automobile.

As described above, according to this invention, there is no need to previously stock the first exterior product and the second exterior product obtained by being integrally molded in the predetermined portion of the conductor member, so that the need for time and effort necessary for inventory control or space for stocking the exterior products is eliminated and also the need for a transportation cost of the exterior products is eliminated. Therefore, a cost of the wire harness can be reduced.

What is claimed is:

1. A wire harness comprising:

at least one long conductor member constructed of a conductive metal, an end portion of the at least one long conductor member on which a plastic processing is performed so as to mold the end portion into a terminal shape to form a terminal part;

a plurality of exterior products constructed of an insulating synthetic resin and attached to a predetermined portion of the conductor member;

a first exterior product of the plurality of exterior products integrally molded with and attached to the predetermined portion of the conductor member;

a second exterior product of the plurality of exterior products integrally molded with and attached to the predetermined portion of the conductor member; and a connector housing which covers the terminal part as the exterior product and is integrally attached to the end portion as the predetermined portion of the conductor member such that the terminal part is exposed at only one side of the connector housing, wherein a covering part, a rubber stopper, a connector housing, a packing and a protective part are integrally molded in the predetermined portion of the conductor member.

2. The wire harness as claimed in claim 1, wherein the conductor member is bended in a predetermined shape.

3. A method for manufacturing a circuit body comprising at least one long conductor member constructed of a conductive metal, and a plurality of exterior products constructed of an insulating synthetic resin and attached to a predetermined portion of the conductor member, the method comprising:

a first member molding step of integrally molding a first exterior product of the plurality of exterior products in the predetermined portion of the conductor member and attaching said first exterior product to the conductor member;

a second member molding step of integrally molding a second exterior product of the plurality of exterior products in the predetermined portion of the conductor member and attaching said second exterior product to the conductor member;

a terminal molding step of performing a plastic processing in an end portion of the conductor member to mold the end portion in a terminal shape so as to be a terminal part; and a housing molding step of integrally molding a connector housing for covering an end portion of the conductor member formed in the terminal shape as the exterior product in the end portion as a predetermined portion of the conductor member and attaching said connector housing to the conductor member such that the terminal part is exposed at only one side of the connector housing, wherein at least the first member molding step and the second member molding step are performed in one manufacturing line, and a covering part, a rubber stopper, a connector housing, a packing and a protective part are integrally molded in the predetermined portion of the conductor member.

4. The method for manufacturing a circuit body as claimed in claim 3, wherein in the terminal molding step, the conductor member is bended in a predetermined shape.

* * * * *